(12) United States Patent
Vangi

(10) Patent No.: US 10,827,867 B1
(45) Date of Patent: Nov. 10, 2020

(54) MAILBOX DELIVERY NOTIFICATION SYSTEM

(71) Applicant: Michael Vangi, Bayside, NY (US)

(72) Inventor: Michael Vangi, Bayside, NY (US)

( * ) Notice: Subject to any disclaimer, the term of this patent is extended or adjusted under 35 U.S.C. 154(b) by 0 days.

(21) Appl. No.: 16/659,657

(22) Filed: Oct. 22, 2019

(51) Int. Cl.
| | |
|---|---|
| *G08B 13/14* | (2006.01) |
| *A47G 29/12* | (2006.01) |
| *G08B 21/18* | (2006.01) |
| *H04W 4/12* | (2009.01) |
| *H01H 36/00* | (2006.01) |
| *H01M 10/46* | (2006.01) |
| *H04W 84/04* | (2009.01) |

(52) U.S. Cl.
CPC ......... *A47G 29/1214* (2013.01); *G08B 21/18* (2013.01); *H01H 36/0013* (2013.01); *H01H 36/0033* (2013.01); *H01M 10/465* (2013.01); *H04W 4/12* (2013.01); *A47G 2029/12105* (2017.08); *H01M 2220/10* (2013.01); *H04W 84/042* (2013.01)

(58) Field of Classification Search
CPC .............. A47G 29/1214; A47G 29/121; A47G 29/122; H01L 41/113; H04N 5/2257; G06K 9/00087; G07C 9/00079
See application file for complete search history.

(56) References Cited

U.S. PATENT DOCUMENTS

| | | |
|---|---|---|
| D338,632 S | 8/1993 | Colberg |
| 5,950,919 A * | 9/1999 | Adams ............... A47G 29/1214 232/17 |
| 5,975,713 A | 11/1999 | Brothers |
| 6,114,959 A | 9/2000 | Bennett |
| 6,222,451 B1 | 4/2001 | Leow |
| 7,486,948 B1 | 2/2009 | Vergon |
| 7,506,796 B1 | 3/2009 | Hanna |
| 7,786,862 B1 * | 8/2010 | Campbell .......... A47G 29/1214 340/539.1 |
| 7,843,340 B2 | 11/2010 | Davis |
| 10,028,111 B2 * | 7/2018 | Ansari .................... H04W 4/12 |
| 10,455,965 B1 * | 10/2019 | Amati ................ A47G 29/1214 |
| 2008/0040243 A1 * | 2/2008 | Chang .................... G06Q 10/00 705/28 |
| 2015/0359371 A1 | 12/2015 | Giovinco |
| 2017/0295979 A1 * | 10/2017 | Appell ............... A47G 29/1214 |
| 2019/0074820 A1 * | 3/2019 | Namai ................... H03K 3/037 |

FOREIGN PATENT DOCUMENTS

| | | |
|---|---|---|
| WO | 2015193154 | 12/2015 |

\* cited by examiner

*Primary Examiner* — Toan N Pham

(74) *Attorney, Agent, or Firm* — Kyle A. Fletcher, Esq.

(57) ABSTRACT

The mailbox delivery notification system is configured for use with a mailbox and a personal data device. The mailbox delivery notification system monitors the mailbox. The mailbox delivery notification system transmits a message to the personal data device when the mailbox delivery notification system detects that the mailbox door has been opened to deliver the mail. The mailbox delivery notification system comprises a housing, a reed switch, and a control circuit. The housing contains the control circuit and a portion of the reed switch. The reed switch electrically connects to the control circuit. The reed switch generates an electric signal indicating that the mailbox door is open. The control circuit monitors the reed switch. The control circuit transmits a message to the personal data device when the control circuit detects the electric signal indicating that the mailbox door is open.

18 Claims, 5 Drawing Sheets

MAILBOX DELIVERY NOTIFICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of household equipment including parts and details of mail receptacles, more specifically, signaling device for a mailbox.

SUMMARY OF INVENTION

The mailbox delivery notification system is configured for use with a mailbox. The mailbox further comprises a mail container and a mailbox door. The mailbox stores mail that is placed into the mail container through the mailbox door. The mailbox delivery notification system is configured for use with a personal data device. The personal data device further comprises an application. The mailbox delivery notification system monitors the mailbox. The mailbox delivery notification system transmits a message to the personal data device when the mailbox delivery notification system detects that the mailbox door has been opened to deliver the mail. The mailbox delivery notification system comprises a housing, a reed switch, and a control circuit. The housing contains the control circuit and a portion of the reed switch. The reed switch electrically connects to the control circuit. The reed switch generates an electric signal indicating that the mailbox door is open. The control circuit monitors the reed switch. The control circuit transmits a message to the personal data device when the control circuit detects the electric signal indicating that the mailbox door is open.

These together with additional objects, features and advantages of the mailbox delivery notification system will be readily apparent to those of ordinary skill in the art upon reading the following detailed description of the presently preferred, but nonetheless illustrative, embodiments when taken in conjunction with the accompanying drawings.

In this respect, before explaining the current embodiments of the mailbox delivery notification system in detail, it is to be understood that the mailbox delivery notification system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mailbox delivery notification system.

It is therefore important that the claims be regarded as including such equivalent construction insofar as they do not depart from the spirit and scope of the mailbox delivery notification system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
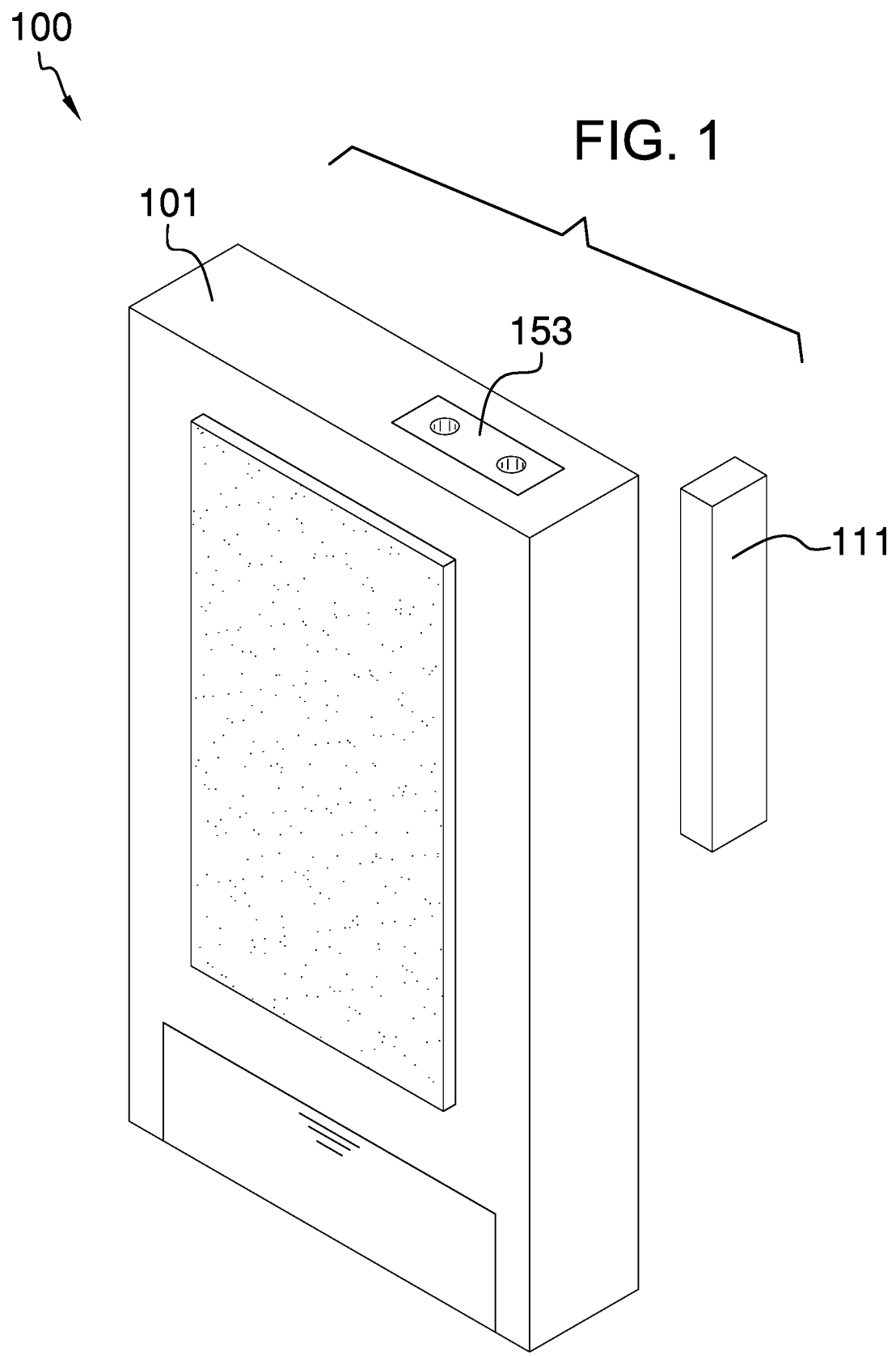
FIG. 1 is a perspective view of an embodiment of the disclosure.
Figure 2:
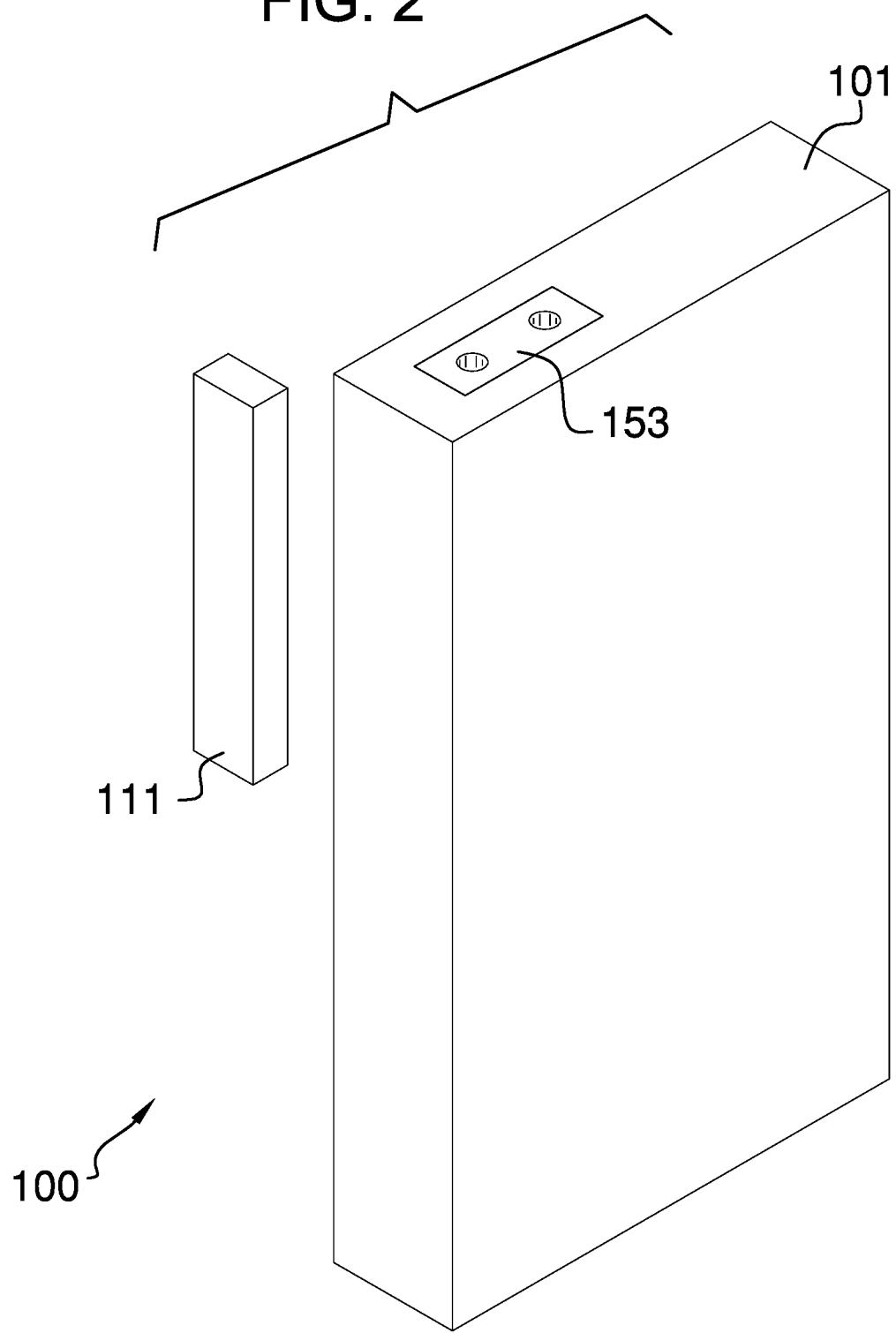
FIG. 2 is a perspective view of an embodiment of the disclosure.
Figure 3:
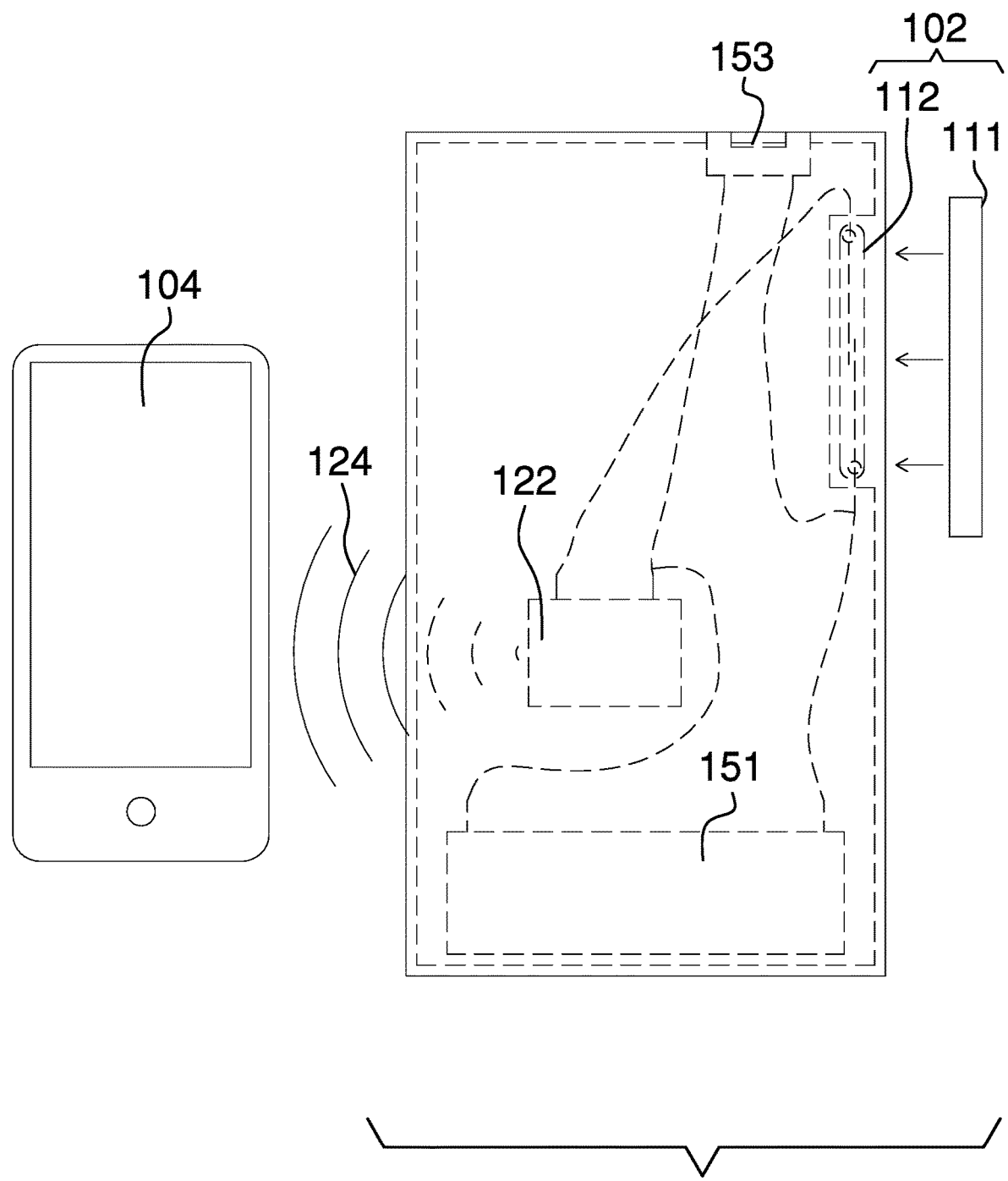
FIG. 3 is a detail view of an embodiment of the disclosure.
Figure 4:
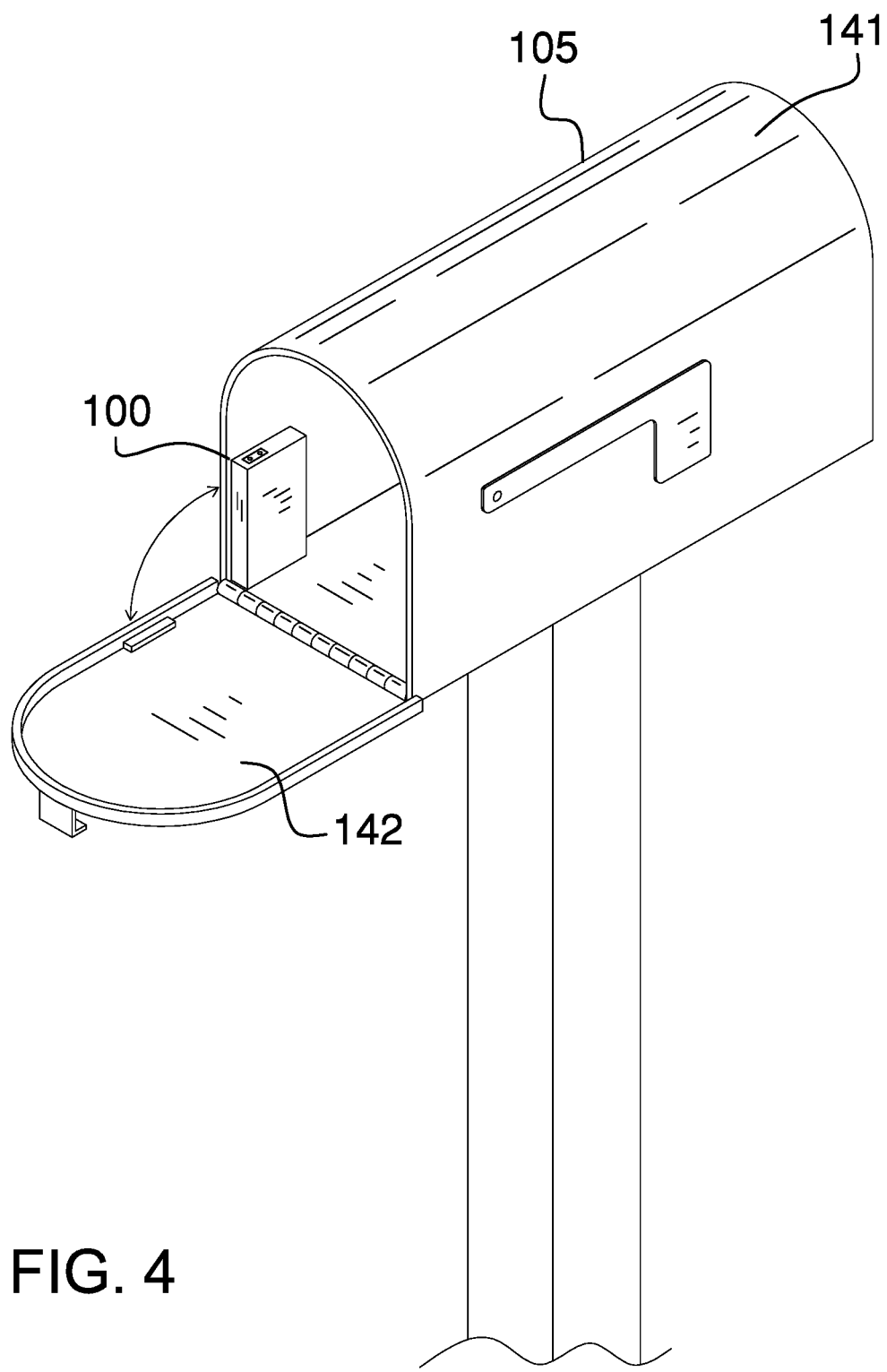
FIG. 4 is an in-use view of an embodiment of the disclosure.
Figure 5:
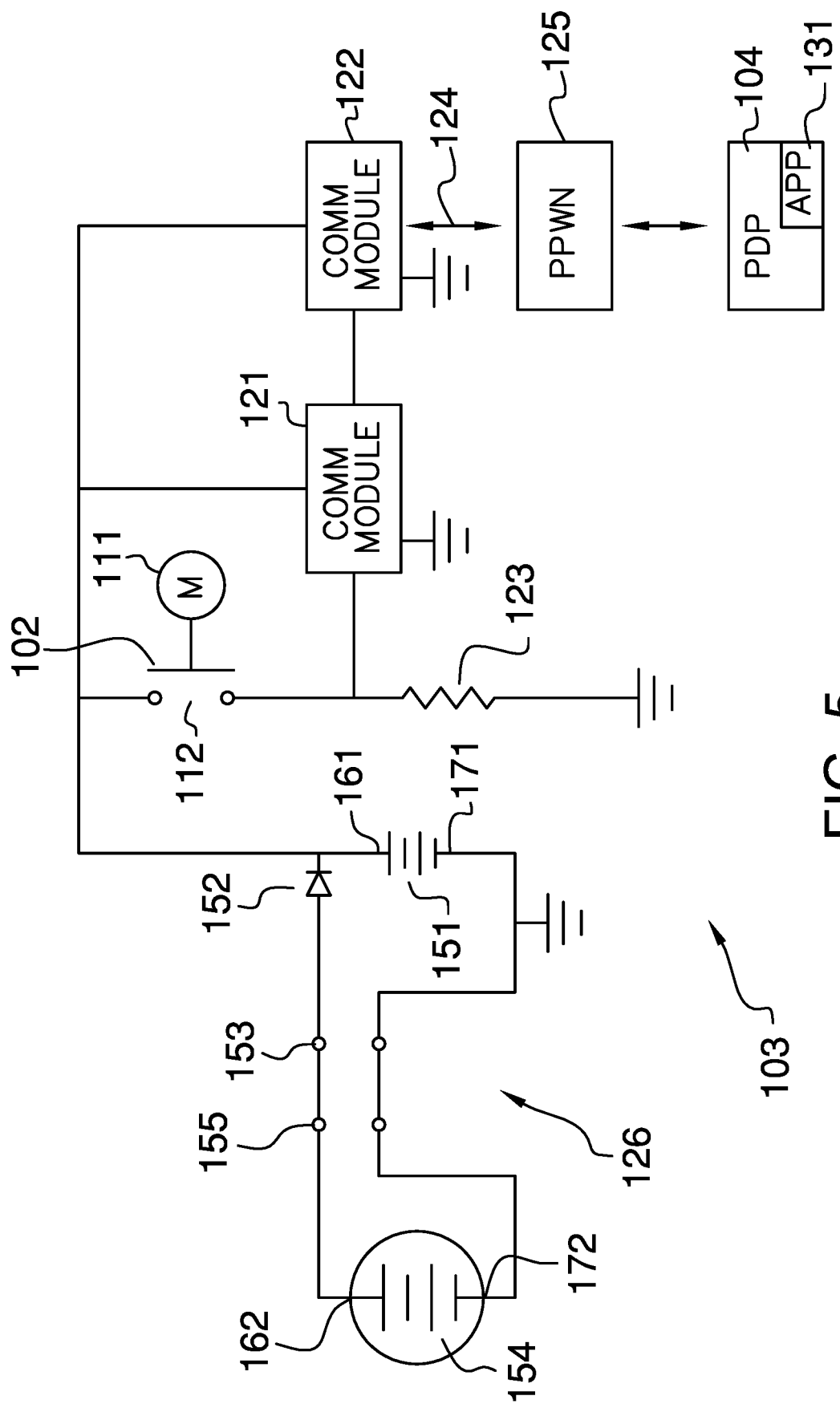
FIG. 5 is a schematic view of an embodiment of the disclosure.

Detailed reference will now be made to one or more potential embodiments of the disclosure, which are illustrated in FIGS. 1 through 5.

The mailbox delivery notification system 100 (hereinafter invention) is configured for use with a mailbox 105. The mailbox 105 further comprises a mail container 141 and a mailbox 105 door 142. The mailbox 105 stores mail that is placed into the mail container 141 through the mailbox 105 door 142. The invention 100 is configured for use with a personal data device 104. The personal data device 104 further comprises an application 131. The invention 100 monitors the mailbox 105. The invention 100 transmits a message to the personal data device 104 when the invention 100 detects that the mailbox 105 door 142 has been opened to deliver the mail.

The invention 100 comprises a housing 101, a reed switch 102, and a control circuit 103. The housing 101 contains the control circuit 103 and a portion of the reed switch 102. The reed switch 102 electrically connects to the control circuit 103. The reed switch 102 generates an electric signal indicating that the mailbox 105 door 142 is open. The control circuit 103 monitors the reed switch 102. The control circuit 103 transmits a message to the personal data device 104 when the control circuit 103 detects the electric signal indicating that the mailbox 105 door 142 is open.

The personal data device 104 is a programmable electrical device that provides data management and communication services through one or more functions referred to as an application 131. The application 131 is a set of logical operating instructions that are performed by the personal data device 104. The addition of an application 131 will provide increased functionality for the personal data device 104. This disclosure assumes that an application 131 exists for the purpose of interacting with the invention 100. Methods to design and implement an application 131 on a personal data device 104 are well known and documented in the electrical arts. The personal data device 104 is defined elsewhere in this disclosure.

The mail container 141 is a hollow prism-shaped structure. The mail container 141 has a pan shape. The mail container 141 forms a storage space used to contain mail. The mailbox 105 door 142 is a lid. The mailbox 105 door 142 encloses the open face of the pan structure of the mail container 141. The mailbox 105 door 142 attaches to the mail container 141 such that the mailbox 105 door 142 rotates relative to the mail container 141.

The housing 101 is a rigid structure. The housing 101 contains the control circuit 103 and a portion of the reed switch 102. The housing 101 is formed with all apertures and form factors necessary to allow the housing 101 to accommodate the use, the operation, and the external connections of the control circuit 103 and the reed switch 102. Methods to form a housing 101 suitable for the purposes described in this disclosure are well-known and documented in the mechanical arts. The housing 101 attaches to the interior surface of the mail container 141 of the mailbox 105.

The reed switch 102 is a magnetically operated switch. The reed switch 102 is defined elsewhere in this disclosure. The reed switch 102 is held in an open position when the mailbox 105 door 142 of the mailbox 105 is in a closed position. The reed switch 102 is well-known and documented in the electrical arts. The reed switch 102 comprises a magnet 111 and a control switch 112.

The magnet 111 is a disk-shaped structure that is magnetically attracted to a magnetic material. The magnet 111 magnetically attaches to the mailbox 105 door 142. The magnet 111 is positioned on the mailbox 105 door 142 such that the magnet 111 is proximal to the housing 101 when the mailbox 105 door 142 is in a closed position.

The control switch 112 is an electric switch. The control switch 112 controls the flow of electricity within the control circuit 103. The control switch 112 signals to the control circuit 103 the position of the mailbox 105 door 142. The control switch 112 mounts in the housing 101. The magnet 111 controls the actuation of the control switch 112. The control switch 112 is positioned in the housing 101 such that the magnet 111 will actuate the control switch 112 to an open position when the mailbox 105 door 142 is in a closed position.

The control circuit 103 is an electric circuit. The control circuit 103 manages and regulates the operation of the invention 100. The control circuit 103 monitors the position of the mailbox 105 door 142. The control circuit 103 generates and transmits a message to the personal data device 104 when the control circuit 103 detects that the mailbox 105 door 142 is open. The control circuit 103 is an independently powered electric circuit. By independently powered is meant that the control circuit 103 can operate without an electrical connection to an external power source. The control circuit 103 comprises a logic module 121, a communication module 122, a pull-down resistor 123, and a power circuit 126. The communication module 122 further comprises a wireless communication link 124 and a commercially provided and publicly available cellular wireless network 125. The logic module 121, the communication module 122, the pull-down resistor 123, and the power circuit 126 are electrically interconnected.

The logic module 121 is a readily and commercially available programmable electronic device that is used to manage, regulate, and operate the control circuit 103. Depending on the specific design and the selected components, the logic module 121 can be a separate component within the control circuit 103 or the functions of the logic module 121 can be incorporated into another component within the control circuit 103.

The communication module 122 is a wireless electronic communication device that establishes a wireless communication link 124 between the control circuit 103 and a commercially provided and publicly available cellular wireless network 125. The communication module 122 communicates SMS and MMS messages between the logic module 121 and the personal data device 104 through the commercially provided and publicly available cellular wireless network 125. The use of a commercially provided and publicly available cellular wireless network 125 is preferred because: a) of its low cost; b) of the widespread availability and the broad interoperability between competing commercially provided and publicly available cellular wireless networks 125; and, c) methods and techniques to send SMS and MMS messages over a commercially provided and publicly available cellular wireless network 125 are well known and documented by those skilled in the electrical arts.

The pull-down resistor 123 is an electrical circuit element. The pull-down resistor 123 presents a voltage to the logic module 121 that indicates the position of the mailbox 105 door 142. The pull-down resistor 123 electrically connects in series with the control switch 112. The power circuit 126, the control switch 112, and the pull-down resistor 123 are electrically connected to form a series circuit. The pull-down resistor 123 limits the flow of electricity through the control switch 112 of the reed switch 102. The voltage presented by the pull-down resistor 123 to the logic module 121 is controlled by the control switch 112 of the reed switch 102.

The power circuit 126 is an electrical circuit. The power circuit 126 powers the operation of the control circuit 103. The power circuit 126 is an electrochemical device. The power circuit 126 converts chemical potential energy into the electrical energy required to power the control circuit 103. The power circuit 126 further comprises a battery 151, a diode 152, a charging port 153, and a photovoltaic cell 154. The battery 151, the diode 152, the charging port 153, the photovoltaic cell 154, and the charging plug 155 are electrically interconnected. The photovoltaic cell 154 further comprises a charging plug 155. The battery 151 is further defined with a first positive terminal 161 and a first negative terminal 171. The photovoltaic cell 154 is further defined with a second positive terminal 162 and a second negative terminal 172.

The battery 151 is an electrochemical device. The battery 151 converts chemical potential energy into the electrical energy used to power the control circuit 103. The battery 151 is a commercially available rechargeable battery 151. The chemical energy stored within the rechargeable battery 151 is renewed and restored through the use of the charging port 153. The charging port 153 is an electrical circuit that reverses the polarity of the rechargeable battery 151 and provides the energy necessary to reverse the chemical processes that the rechargeable battery 151 initially used to generate the electrical energy. This reversal of the chemical process creates a chemical potential energy that will later be used by the rechargeable battery 151 to generate electricity.

The charging port 153 forms an electrical connection to a photovoltaic cell 154 using a charging plug 155. The charging plug 155 forms a detachable electrical connection with the charging port 153. The charging port 153 receives electrical energy from the photovoltaic cell 154 through the charging plug 155. The diode 152 is an electrical device that allows current to flow in only one direction. The diode 152 installs between the rechargeable battery 151 and the charging port 153 such that electricity will not flow from the first positive terminal 161 of the rechargeable battery 151 into the second positive terminal 162 of the photovoltaic cell 154.

The following definitions were used in this disclosure:

And/Or: As used in this disclosure, the term and/or is a grammatical conjunction that implies the logical function known as the inclusive or. Specifically, the term and/or implies that at least one and potentially more than one of the plurality of statements joined by the and/or conjunction will be true.

Battery: As used in this disclosure, a battery is a chemical device consisting of one or more cells, in which chemical energy is converted into electricity and used as a source of power. Batteries are commonly defined with a positive terminal and a negative terminal.

Commercially Provided And Publicly Available Cellular Wireless Network: As used in this disclosure, a commercially provided and publicly available cellular wireless network refers to subscription based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Control Circuit: As used in this disclosure, a control circuit is an electrical circuit that manages and regulates the behavior or operation of a device.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electric Circuit: As used in this disclosure, an electric circuit is a closed loop path through which electrons flow. The closed loop will generally initiate and terminate at an electrical power source.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Housing: As used in this disclosure, a housing is a rigid structure that encloses and protects one or more devices.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field.

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein an end of prism structure of the pan and a portion of the lateral face of the pan is also open.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones. See logical device Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

PPWN: As used in this disclosure, the PPWN is an acronym for publically provided wireless network. The PPWN refers to a commercially provided and publicly available cellular wireless network.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pull-Down Resistor: As used in this disclosure, a pull-down resistor is an electrical resistor that is used within a switching circuit or logic circuit to present a predetermined signal voltage to a logic element or switching element; and/or, b) is used as a limit resistor to control the flow of electricity through a circuit element.

Reed Switch: As used in this disclosure, a reed switch is an electrical switch that is actuated by exposure to an externally provided magnetic field.

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mailbox delivery notification system comprising a housing, a reed switch, and a control circuit;
   wherein the housing contains the control circuit and a portion of the reed switch; wherein the mailbox delivery notification system is configured for use with a mailbox;
   wherein the mailbox further comprises a mail container and a mailbox door; wherein the mailbox delivery notification system is configured for use with a personal data device;
   wherein the personal data device is a programmable electrical device; wherein the mailbox delivery notification system monitors the mailbox; wherein the mailbox delivery notification system transmits a message to the personal data device when the mailbox delivery notification system detects that the mailbox door has been opened to deliver mail;
   wherein the control circuit comprises a logic module, a communication module,
   a pull-down resistor, and a power circuit; wherein the logic module, the communication module, the pull-down resistor,
   and the power circuit are electrically interconnected; wherein the pull-down resistor is an electrical circuit element;
   wherein the pull-down resistor presents a voltage to the logic module that indicates a position of the mailbox door; wherein the pull-down resistor electrically connects in series with a control switch;

wherein the power circuit, the control switch, and the pull-down resistor are electrically connected to form a series circuit; wherein the pull-down resistor limits the flow of electricity through the control switch of the reed switch;

wherein the voltage presented by the pull-down resistor to the logic module is controlled by the control switch of the reed switch.

2. The mailbox delivery notification system according to claim 1 wherein the reed switch electrically connects to the control circuit;

wherein the reed switch generates an electric signal indicating that the mailbox door is open;

wherein the control circuit monitors the reed switch;

wherein the control circuit transmits a message to the personal data device when the control circuit detects the electric signal indicating that the mailbox door is open.

3. The mailbox delivery notification system according to claim 2 wherein the mail container is a hollow prism-shaped structure;

wherein the mail container has a pan shape;

wherein the mailbox door is a lid;

wherein the mailbox door encloses the open face of the pan structure of the mail container;

wherein the mailbox door attaches to the mail container such that the mailbox door rotates relative to the mail container.

4. The mailbox delivery notification system according to claim 3 wherein the housing is a rigid structure;

wherein the housing attaches to the interior surface of the mail container of the mailbox.

5. The mailbox delivery notification system according to claim 4 wherein the reed switch is a magnetically operated switch;

wherein the reed switch is held in an open position when the mailbox door of the mailbox is in a closed position.

6. The mailbox delivery notification system according to claim 5 wherein the control circuit is an electric circuit;

wherein the control circuit monitors the position of the mailbox door;

wherein the control circuit generates and transmits a message to the personal data device when the control circuit detects that the mailbox door is open.

7. The mailbox delivery notification system according to claim 6 wherein the reed switch comprises a magnet and a control switch;

wherein the magnet controls the actuation of the control switch.

8. The mailbox delivery notification system according to claim 7 wherein the magnet is a disk-shaped structure that is magnetically attracted to a magnetic material;

wherein the magnet magnetically attaches to the mailbox door;

wherein the magnet is positioned on the mailbox door such that the magnet is proximal to the housing when the mailbox door is in a closed position.

9. The mailbox delivery notification system according to claim 8 wherein the control switch is an electric switch;

wherein the control switch controls the flow of electricity within the control circuit;

wherein the control switch signals to the control circuit the position of the mailbox door.

10. The mailbox delivery notification system according to claim 9 wherein the control switch mounts in the housing;

wherein the control switch is positioned in the housing such that the magnet will actuate the control switch to an open position when the mailbox door is in a closed position.

11. The mailbox delivery notification system according to claim 10 wherein the communication module further comprises a wireless communication link and a commercially provided and publicly available cellular wireless network;

wherein the communication module is a wireless electronic communication device that establishes the wireless communication link between the control circuit and the commercially provided and publicly available cellular wireless network;

wherein the communication module communicates SMS and MMS messages between the logic module and the personal data device through the commercially provided and publicly available cellular wireless network.

12. The mailbox delivery notification system according to claim 11 wherein the power circuit is an electrical circuit;

wherein the power circuit powers an operation of the control circuit;

wherein the power circuit is an electrochemical device;

wherein the power circuit converts chemical potential energy into an electrical energy required to power the control circuit.

13. The mailbox delivery notification system according to claim 12 wherein the control circuit is an independently powered electric circuit;

wherein by independently powered is meant that the control circuit can operate without an electrical connection to an external power source.

14. The mailbox delivery notification system according to claim 13 wherein the power circuit further comprises a battery, a diode, a charging port, and a photovoltaic cell;

wherein the photovoltaic cell further comprises a charging plug;

wherein the battery, the diode, the charging port, the photovoltaic cell, and the charging plug are electrically interconnected;

wherein the battery is further defined with a first positive terminal and a first negative terminal;

wherein the photovoltaic cell is further defined with a second positive terminal and a second negative terminal.

15. The mailbox delivery notification system according to claim 14 wherein the battery is an electrochemical device;

wherein the battery converts chemical potential energy into the electrical energy used to power the control circuit;

wherein the battery is a rechargeable battery.

16. The mailbox delivery notification system according to claim 15 wherein the charging port is an electrical circuit that reverses a polarity of the rechargeable battery and provides the energy necessary to reverse a chemical processes that the rechargeable battery initially used to generate the electrical energy.

17. The mailbox delivery notification system according to claim 16
- wherein the charging port forms an electrical connection to a photovoltaic cell using a charging plug;
- wherein the charging plug forms a detachable electrical connection with the charging port;
- wherein the charging port receives electrical energy from the photovoltaic cell through the charging plug.

18. The mailbox delivery notification system according to claim 17
- wherein the diode is an electrical device that allows current to flow in only one direction;
- wherein the diode installs between the rechargeable battery and the charging port such that electricity will not flow from the first positive terminal of the rechargeable battery into the second positive terminal of the photovoltaic cell.

\* \* \* \* \*